United States Patent [19]

Herbert, Jr.

[11] Patent Number: 5,087,193
[45] Date of Patent: Feb. 11, 1992

[54] APPARATUS FOR FORMING A COMPOSITE ARTICLE

[76] Inventor: Kenneth H. Herbert, Jr., 2101 Jane Ct., Grand Haven, Mich. 49417

[21] Appl. No.: 565,380

[22] Filed: Aug. 9, 1990

[51] Int. Cl.⁵ .................................. B28B 7/30
[52] U.S. Cl. .................................. 425/543; 264/257; 264/314; 425/389; 425/405.1; 425/417; 425/419; 425/577; 425/DIG. 44
[58] Field of Search .............. 264/257, 258, 313, 314; 425/412, 543, 419, 389, 390, DIG. 44, 405.1, 417, 542, 577; 249/65

[56] References Cited

U.S. PATENT DOCUMENTS

| | | | |
|---|---|---|---|
| 2,356,860 | 8/1944 | Lewis | 425/417 |
| 2,706,309 | 4/1955 | Lampman | 425/405.1 |
| 2,913,036 | 11/1959 | Smith | 264/253 |
| 2,945,262 | 7/1960 | Patty | 264/257 |
| 2,952,040 | 9/1960 | Phillips | 264/258 |
| 3,050,780 | 8/1962 | Pollit | 264/257 |
| 3,135,640 | 6/1964 | Kepka et al. | 156/147 |
| 3,344,007 | 9/1967 | Skoggard | 264/314 |
| 4,123,494 | 10/1978 | Evrard et al. | 264/258 |
| 4,132,755 | 1/1979 | Johnson | 425/389 |
| 4,201,823 | 5/1980 | Russel | 264/258 |
| 4,312,829 | 1/1982 | Fourcher | 264/313 |
| 4,492,607 | 1/1985 | Halcomb | 156/247 |
| 4,624,820 | 11/1986 | Barraclough | 264/313 |
| 4,657,717 | 4/1987 | Cattanach et al. | 264/314 |
| 4,759,893 | 7/1988 | Krauter | 264/258 |
| 4,765,166 | 8/1988 | Bergman et al. | 425/389 |
| 4,902,215 | 2/1990 | Seemann, III | 156/382 |

Primary Examiner—Jay H. Woo
Assistant Examiner—Robert B. Davis

[57] ABSTRACT

An apparatus and method are described for the formation of a three dimensional composite article by use of a flexible male mold placeable within a cavity formed within a rigid female mold. Fibers are initially bound to the surface of the flexible male mold and the mold is thereafter placed inside the female mold cavity. The surface of the flexible male mold is thereafter displaced away from the female mold by the injection of hardenable resin between the molds. The flexible surface is thereafter returned to near its original position adjacent the female mold. The flexible mold includes a chamber defined therein capable of pressurization and depressurization during the fabrication process of the composite article.

5 Claims, 5 Drawing Sheets

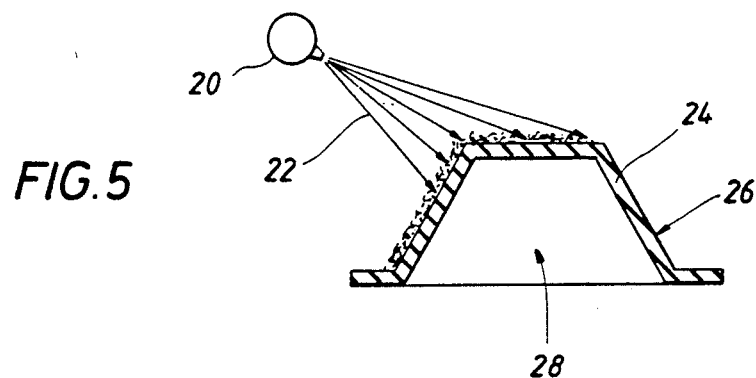
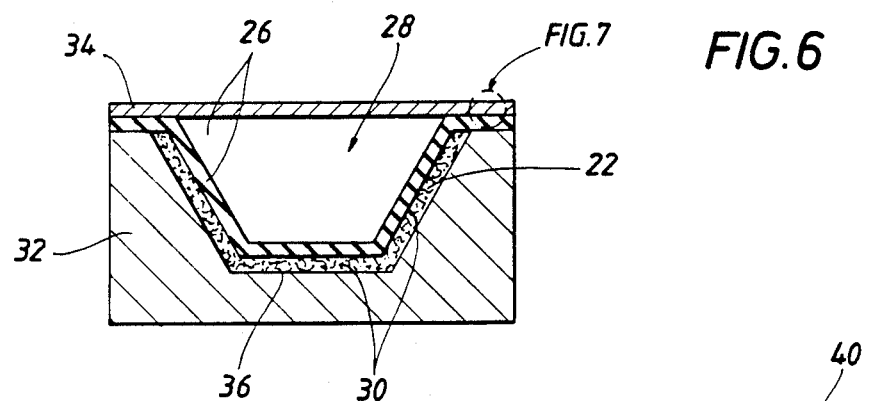
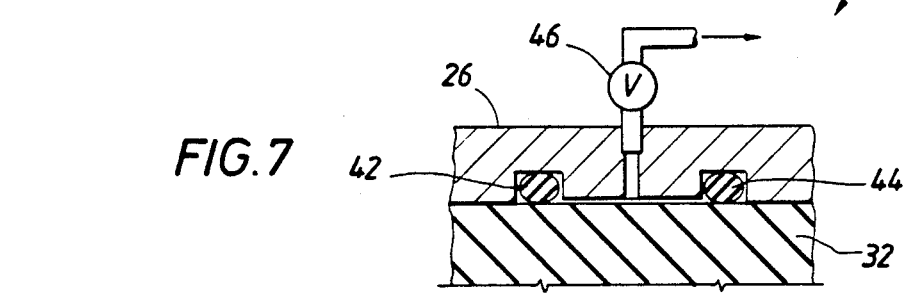
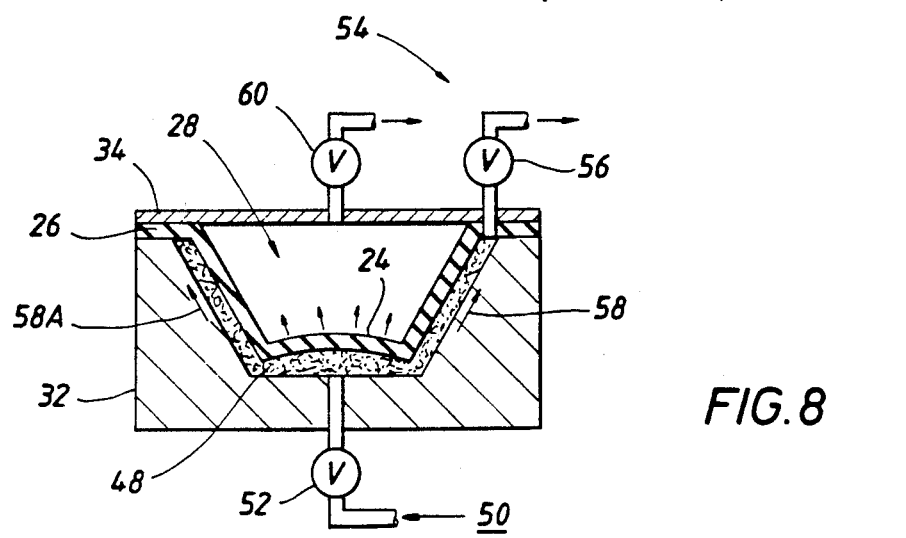

APPARATUS FOR FORMING A COMPOSITE ARTICLE

BACKGROUND

1. Field of the Invention

This invention relates to the formation of a composite article by use of a rigid female mold, in combination with a flexible male mold, and will be hereinafter referred to as the Rigid/Flexible Mold System, or simply as "RFMS" technology. The flexible male mold includes a flexible wall placeable an adjustable distance away from the reference surface of the rigid female mold, with the composite article being formed therebetween.

2. Discussion of the Prior Art

Referring now to FIG. 1 in the prior art practice of resin transfer molding, a continuous strand mat 100 or a preformed reinforcement is positioned into an open mold. A rigid cooperatively shaped male mold 102 is mated to the first (female) mold 104 and clamped together. A catalyzed resin 106 mix is thereafter pumped into the cavity formed between the two molds. After a suitable curing cycle, the part is removed from the molds. Foam encapsulation, inserts, and the inclusion of a gel coat on the finish surface are available options during the practice of this process. Resin transfer molding is noted for the use of low pressure injection of the resin system (50 to 70 psi) and the use of directed fiber preforms.

(For the sake of clarity it should be noted, at this point in the specification, that the present RFMS technology offers a still lower resin injection pressure (10 to 30 psi), and preforming of the fibers directly onto the male mold. The technique of forming the fibers directly on the male mold is possible because the male mold is light enough to be easily turned over. Furthermore, the use of a unique instant set binder makes it possible for the glass fiber to hold to the male mold without the use of suction air flow to hold it to the mold until the binder cures.)

Referring now to FIG. 2 in the process of cold press molding fiber reinforcement 108 (preform or mat) is supplied between matching molds, 112, 114 along with thermosetting resin 110. Woven roving may be added for strength. The molds may be previously gel coated. The resin system is applied before the molds are closed under moderate pressure (20 to 50 psi), and the part is cured without heat other than the exothermic heat generated. Elevated molding pressures are not necessary.

(The RFMS technology borrows from the cold press molding process in that the resin system is successfully applied after the preform has been placed in the mold, but the resin is applied after the mold set is closed, so as to reduce toxic emissions. It is possible to apply the resin after the molds are closed by having the male mold divert away from the incoming resin stream, the male mold being flexible. Once the resin is in the mold cavity, the male mold is forced to its proper shape by internal vacuum and by external air pressure and/or steam.)

Referring now to FIG. 3, in the process of vacuum bag molding a flexible film 116 (PVA or cellophane) is placed over the completed wet layup 118 or sprayup, its joints are sealed, and a vacuum is thereafter drawn by vacuum pump 120. The atmospheric pressure (hopefully) eliminates voids in the laminate and forces excess resin and air from the mold.

(The RFMS technology also uses an internal vacuum drawn on the laminate so as to force excess resin and air from the mold. The RFMS technology, however, takes this concept two steps further. First, a semi-rigid male mold is used instead of the dimensionally pliant PVA or cellophane. The semi-rigid male mold "stamps" accurate and repeatable wall thickness into the finished article. Second, in the RFMS process, a fiberglass preform is used and the resin is injected into the perform while the preform is in the mold cavity. This replaces the tedious hand layup or sprayup process in vacuum bag molding with a clean "one shot" process).

Referring now to FIG. 4, the prior art pressure bag molding process utilizes a tailored rubber sheet 122 which is placed against the finished layup or sprayup 122, and air pressure is thereafter applied by blower 124 between the rubber sheet and the pressure plate 126. The pressure eliminates voids and drives excess resin and air out of the laminate so as to densify it and to improve the off-mold surface finish. This process is not compatible with male molds.

(The RFMS technology also utilizes a pressure plate on the male mold to force the excess air and resin out, but improves on this idea by utilizing a semi-rigid male mold that will "stand alone" as the shape of the part to be molded. In pressure bag molding, the tailored rubber sheet is the shape of the part only if it is inside the female mold and under pressure, similar to the film and vacuum bag molding.)

Referring now to U.S. Pat. No. 2,744,043, entitled "Method of Producing Pressure Containers for Fluids", fiberglass threads or threads of other suitable material are applied "wet", (resin saturated), in a mutually super imposed relationship on a removable inflatable core member, in a method generally known as the filament winding process, to manufacture pressure containers. The core member comprises an inflatable mandrel positioned within the windings which may be deflated for removal. The cylindrical shape of the inflatable bladder however, does not allow for any integrally co-cured beam-shaped stiffening inserts to be included about the interior surface of the structure to be molded.

The method disclosed in U.S. Pat. No. 4,126,659 also has similar limitations in that internal stiffeners can not be incorporated in the composite structure during one molding operation, but must be added on in another process step, if desired.

A method and apparatus therefore need to be developed that will incorporate the aforementioned advantages over the resin transfer molding, cold press molding, vacuum bag molding, and pressure bag molding processes, as well as allow the lamination of internal stiffeners within the final composite article in a one step process.

SUMMARY OF THE INVENTION

In a preferred embodiment of the present invention, the apparatus for use in forming the composite article will include a rigid female mold having a cavity defined downwardly therein and a corresponding reference surface facing the cavity, used in combination with a flexible male mold having a mold chamber, a portion of the mold chamber bounded by a flexible wall that may be moved toward and away from the reference surface of the rigid female mold. The capability of the wall to move relative to the reference surface allows the injection of a hardenable resin between the reference surface and the flexible wall, at injection pressures lower than those used to inject resin between two (prior art) hardened mold surfaces.

In operation, prior to assembly of the molds adjacent one other, fibers are first operatively engaged to the surface of the flexible wall by use of a chopper gun in combination with a binder system. The flexible wall with the fibers operatively engaged thereto is thereafter positioned adjacent the reference surface of the female mold, thereby compacting, if necessary, any fibers which have lofted away from the flexible wall.

The resin is thereafter injected between the flexible wall and the reference surface, the resin deflecting a portion of the wall away from the reference surface. Once the resin has distributed satisfactorily through the fibers, the resin is allowed to harden sufficiently to dimensionally stabilize the article, prior to removal of the article from between the molds.

It is an advantage of the present invention that by utilizing the natural phenomena of vacuum and air pressure, most capital intensive equipment common to other fiber-reinforced plastic molding operations are not necessary.

It is another advantage of the present invention that the flexible male mold may include internal support members for the composite article so as to allow the fabrication of structures stiffened by the support members.

It is another advantage that due to the accurate positioning of the fibers on the male mold prior to placement of the mold within the female mold, subsequent excess flash trimming and machining operations are minimized.

It is another advantage that by use of a flexible male mold, the mold can be collapsed away from the composite article after the article has hardened sufficiently, so as to allow the molding of holes in more than one plane in the article, without encountering the problem of die lock.

It is therefore an object of the present invention to provide a simple "one step" process that allows the fabrication of complex three dimensional composite articles.

It is a feature of the present invention to utilize a flexible male mold that may include internal support structures for incorporation into the composite article, in combination with a rigid female mold to provide the required dimensional stability and the required surface finishes for the outer visible surface of the composite article.

These and other features, objects and advantages of the present invention will become apparent from the following detailed description, wherein reference is made to the Figures in the accompanying drawings.

BRIEF DESCRIPTION OF THE DRAWINGS

FIG. 5 shows a schematic representation in a side view in cross section of a stream of chopped glass and binder being applied to the flexible wall of the male mold.

FIG. 6 is a schematic representation in cross section of the male mold placed within the female mold cavity.

FIG. 7 is a schematic representation in cross section of the peripheral seal used about the common outer periphery of the male and female molds.

FIG. 8 is a schematic representation in cross section of the flexible wall shown deformed away from the female mold as resin is injected in the space separating the molds.

DETAILED DESCRIPTION OF THE INVENTION

Figure 16:
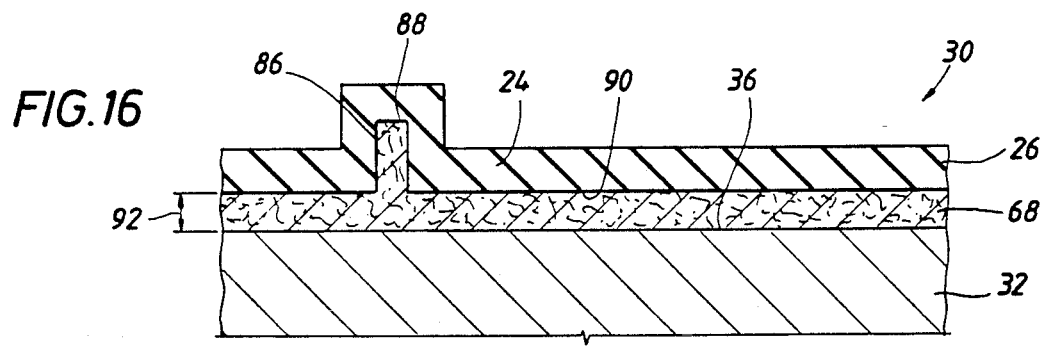
FIG. 16 is a schematic representation in cross section showing a typical lateral stiffener placed within an insert cavity.
Figure 17:
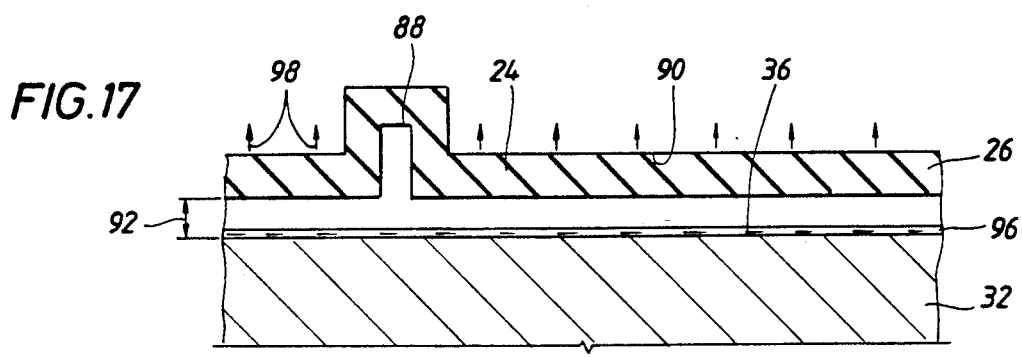
FIG. 17 is a schematic representation in cross section showing the flexible mold surface moved a spaced distance away from the rigid female mold, (the article and stiffener not being shown for clarity).

Referring now to FIG. 5 a chopper gun 20 well known to the art is shown depositing chopped glass and binder 22 on the flexible wall 24 of the flexible male mold 26. The flexible male mold 26 can be seen to have a mold chamber 28 formed therein, a portion of the chamber 28 bounded by the flexible wall 24. In a preferred embodiment the flexible wall would have a thickness of from about $\frac{1}{4}$" to about $\frac{5}{8}$", though the wall thickness may vary in the area of the insert cavities, (FIGS. 16 and 17). The chopped glass and binder system 22 comprises in a preferred embodiment gun roving #227-B2 glass available from Certainteed Preform Inc. and a binder system available from Dexter Plastisols Inc. and identified as an instant set urethane. The average length of the deposited chopped fibers is 1.5 inches and the average thickness of the deposited fibers is 0.5 inches.

Referring now to FIG. 6 the male mold 26 is shown inserted downwardly within the female mold cavity 30 of rigid female mold 32, a pressure plate 34 stiffening the top side of the male mold 26. Due to the low injection and molding pressures the pressure plate may be formed from inexpensive plywood, if desired. The rigid female mold 32 can be seen to have a corresponding reference surface 36 facing the cavity 30.

The flexible male mold would initially be formed within the female mold with sheet wax used to provide the correct offset from the reference surface of the female mold. In a preferred embodiment the male mold is made from a silicone material available from General Electric Corporation and identified as RTV 700 with a beta 2 cure compound and 910 duilent. The silicone material is reinforced with multiple layers of 10 oz.

fiberglass cloth, hand laminated by methods well known to the art.

The silicone polymer gives a high elongation, high heat resistance, and excellent tear strength to the flexible male mold 26. In addition, the silicone eliminates the need for mold release on the male mold. Flexibility of the male mold combined with no requirement for mold release permits molding of deep, thin, and complex grid-like reinforcements. This gives the part designer the ability to make lightweight parts with intricate reinforcement patterns.

The flexible wall 34 of the male mold can be seen to be positionable a variably spaced distance away from the reference surface, the flexible wall, as described herein, being deformable away from the reference surface when hardened resin is injected between the surface 36 and the flexible wall.

The rigid female mold can be made of epoxy, aluminum, nickel or other cast metals. In a preferred embodiment the female mold may be fabricated from polyester tooling resin available for example from Freeman Chemicals Inc. The resin is reinforceable with tooling fiberglass cloth and mat available from Owens Corning Fiberglass Inc. The surface skin may be formed from black tooling gelcoat available from Glidden. The sheet wax and mold release agents that may be used are available from Kindt-Collins Company. These materials may be assembled, or applied, as is well known to the art by use of conventional laminating methods, so as to form the rigid female mold.

Class A surfaces desired on the outer surface of the manufactured composite article would require that the female mold reference surface 36 be previously polished, as is well known to the art.

It should be noted that the chopped glass and binder system 22 shown in FIG. 6 has not yet been saturated with the final hardenable resin system.

Referring now to FIG. 7, a peripheral seal means 40, formed about the common periphery of the rigid female mold and the flexible male mold, is seen to include seal A 42 and seal B 44 formed in a preferred embodiment from 20 durometer neoprene foam cord material available, for example, from Exotic Rubber and Plastics Inc.

In a preferred embodiment seals 42, 44 have a diameter of 0.625 inches and were fitted within groves formed in the male mold 26 having dimensions of 0.625 inches in width by 0.375 inches in depth. Valve 46 removes air from between the seals 42, 44 so as to establish a vacuum therebetween and effectively clamp the molds together. Actuation of the seal means 40 correctly aligns the male mold 26 relative to the female mold 32.

Actuation of the seal means 40 also establishes a vapor barrier such that fugitive VOC emissions, especially styrene, are eliminated from the working environment. This is especially important since, in 1988, styrene was reclassified as a Group IIB substance, possibly carcenogenic to humans.

As a result of this reclassification, OSHA reduced the permissible exposure limits on styrene from 100 parts per million to 50 parts per million. OSHA allowed one exception to this rule. The exception is hand-layup or sprayup of boats because, prior to this invention, there was no feasible engineering method available to permit boat builders to comply with the emission requirements. In addition, there is widespread speculation that styrene will ultimately be classified Group IIA, possibly Group I, clearly carcenogenic. It is therefore an advantage of this RFMS process that large, high quality FRP parts may be manufactured in a closed set of matched molds, such as boat hulls, without the fear of possible carcenogenic consequences.

Additionally, the mold cavity is completely sealed off from the environment so that no resin can leak out. The perimeter vacuum seal eliminates the need for a hydraulic press about the outer periphery of the molds, thus saving capital expense.

Referring now to FIG. 8 a precise amount of catalyzed resin 48, in a preferred embodiment comprising unsaturated polyester resin catalyzed by use of a peroxide cure such as a mekp agent, and having a mixed viscosity of 600 cp., is injected between the reference surface and the flexible wall by use of resin injection means 50, typically comprising a valving arrangement 52 with associated pumping equipment (not shown) as is well known to the art. In a preferred embodiment, a resin injection pressure of approximately 15 psig was used for injection of the resin 48.

The resin injection pressure remains low because the male mold is deflected by the resin away from the reference surface, allowing the resin to spread easily beneath the flexible wall 24.

Because a precise amount of resin is used, there is no requirement for resin bleed-off through any vents. Once the right amount of resin is injected into the mold, the injection entrance is sealed off and a vacuum is applied by actuation of vacuum means 54 comprising valving 56 and pumping equipment (not shown) as is well known to the art. Actuation of the vacuum means 54 establishes a vacuum between the flexible wall and the reference surface, the establishment of the vacuum accelerating the flow of resin away from the point of resin injection, the resin flowing in the direction of resin flow indicated by arrows 58, 58A.

Movement of the excess bulk of resin from beneath the bottom portion of the flexible wall allows the flexible wall to move toward the reference surface, so as to again compact the fibers adjacent the reference surface. The force of the vacuum plus the natural capillary action of the fiberglass allows the resin to flow out and up the sides of the female mold. Because the male mold is a reinforced elastomeric material, the internal vacuum tends to pull the male mold back to its proper shape and form adjacent the reference surface.

Mold chamber 28 may be vented at this point by use, for example, of vent valve 60, as is well known to the art.

Figure 1:
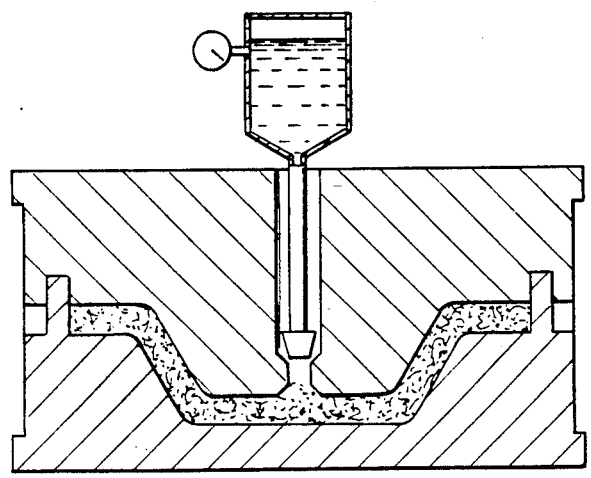
FIGS. 1 through 4 describe the prior art processes of resin transfer, cold press, vacuum bag, and pressure bag molding.
Figure 2:
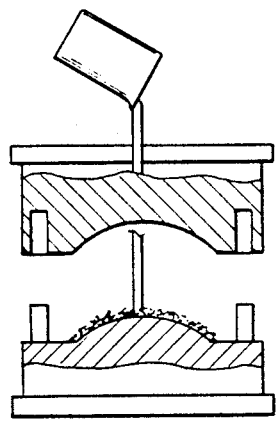
Figure 3:
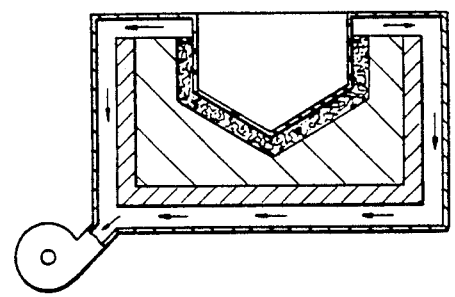
Figure 4:
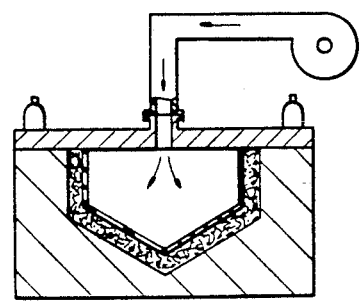
Figure 9:
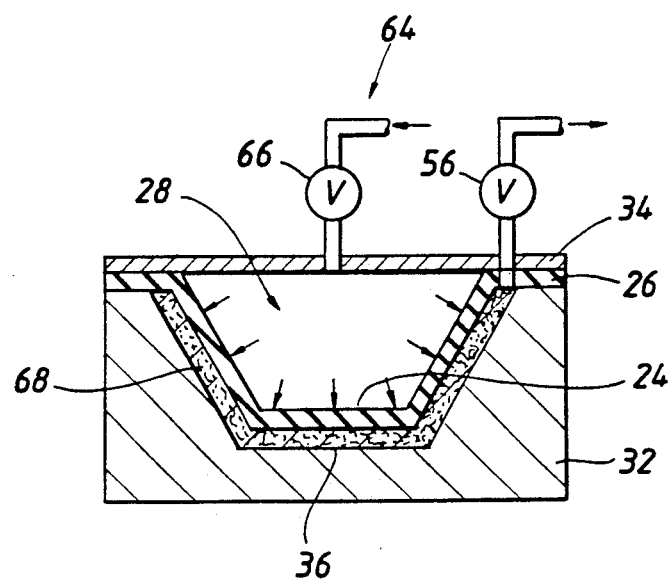
FIG. 9 is a schematic representation in cross section of the flexible wall shown forced toward the reference surface of the female mold.

Referring now to FIG. 9, if a perfect vacuum was established inside the mold halves, the maximum internal pressure would be 14.7 psi. Depending on the glass loading and filler content of the resin system, this pressure may not be sufficient to properly locate the flexible male mold adjacent the reference surface. Air pressure may therefore be applied between the male mold and the pressure plate.

The application of the air pressure eliminates voids and drives air out of the laminate. It allows excellent compaction of the laminate, densifying it and improving the off-mold surface finish. The combination of the internal vacuum, elastomeric male mold and external air pressure allows the molds to function much the same as a mechanical press. This phenomenon allows for fast cycle times having greatly reduced capital requirements.

The external air pressure may be applied by actuation of the first fluid transfer means 64 including valving 66 and a pressurized source of air or fluid which when actuated forces the flexible wall towards the reference surface as is shown in FIG. 9.

While the composite article 68 which now includes the resin is curing, the flexible male mold plays another important role. As the article 68 cures it shrinks. It shrinks onto the flexible male mold and away from the rigid female mold. This creates a space between the article 68 and the female mold. At the appropriate time, the internal fluid pressure may be removed from the mold chamber 28, the vacuum may be removed, and thereafter a thermoset coating may be injected under low pressure to fill the space created by the shrinking of the resin.

As before, this coating would puddle in the bottom of the female mold until vacuum is again applied. At this point, external air pressure would probably be applied in the mold chamber, depending on the desired thickness and quality of surface finish expected of the surface coating.

Application of this surface coating or "gel coating" system at this point in the RFMS process provides two important cost saving advantages. First, since the coating is applied in the mold after the article has been dimensionally stabilized, the requirement for an expensive high performance, low profile resin system is diminished. In fact, some fiber print and porosity in the resin 48 would give the advantage of added surface area to which the surface coating could bond.

The second advantage of the coating is that it will eliminate the requirement of a primer coat on the finish surface as a secondary operation. By elimination of the primer operation, the capital requirements of a paint booth and oven are removed. In addition, because most of the sanding and post finishing are eliminated, labor dollars are saved. The risk of "read through" appearing on the show side of the article is eliminated, if an article coating system were to be used, because the coating would be applied after the part is made and has shrunk. Thus, any read through is covered by the coating. The coating in a preferred embodiment would comprise polyester gel coat, or possibly an epoxy/acrylic gel coat system.

Figure 10:
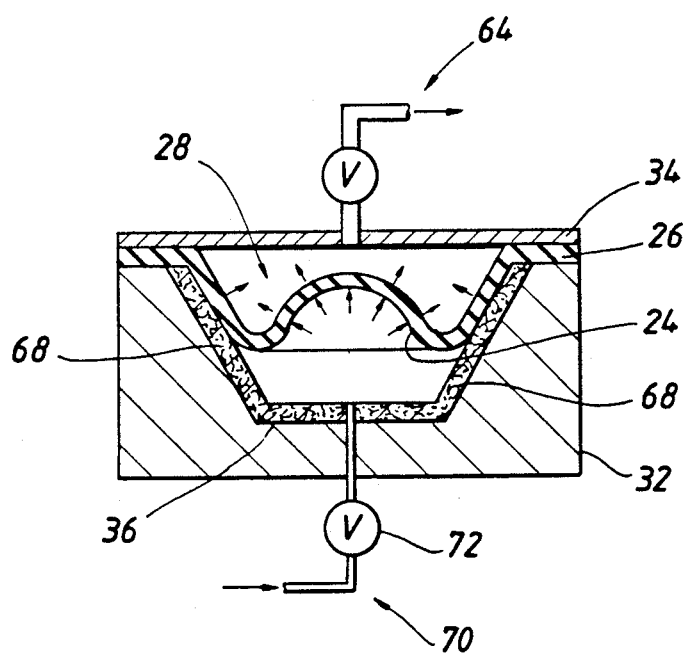
FIG. 10 is a schematic representation in cross section of the flexible wall being moved away from the molded composite article.

Referring now to FIG. 10 the article 68 is shown being demolded from the molds 26, 32 by collapsing the flexible wall 24 after the resin 48 has hardened sufficiently to dimensionally stabilize the article, by actuation of the first fluid transfer means 64 so as to remove fluid from the male mold chamber 28 to draw the flexible wall away from the article 68. The apparatus may also include a second fluid transfer means 70 and associated valving 72 and fluid pump (not shown) to supply fluid beneath the flexible wall 24 so as to assist the movement of the flexible wall 24 upward away from the article 68.

Figure 11:
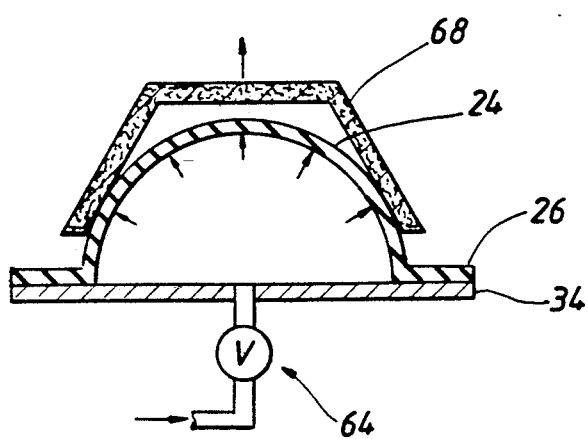
FIG. 11 is a schematic representation in cross section showing the expansion of the flexible wall so as to force the composite article away from the flexible male mold.

Referring now to FIG. 11, in an alternative embodiment, the article 68, flexible mold 26, and the pressure plate 34 may be first removed from the female mold 32 and the first fluid transfer means 64 actuated so as to expand the flexible wall 24 sufficiently to "pop" the article 68 away from the flexible mold 26.

Figure 12:
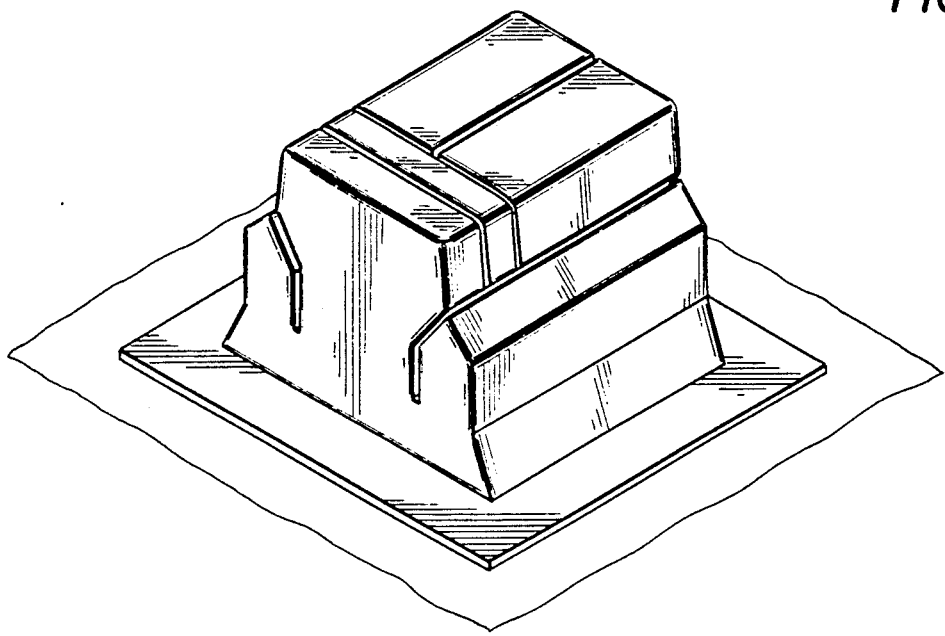
FIG. 12 is a diagrammatic isometric view of an actual flexible male mold used to mold a hood structure having internal stiffeners incorporated therein.

Referring now to FIG. 12 a pictorial representation of an actual flexible male mold 76 is shown that was used to fabricate a truck hood structure, the mold being shown in its unexpanded state. Note the inclusion of the insert cavities 88 that are sized to receive structural stiffeners, the insert cavities being extended in a three-dimensional manner relative to the surface of the male mold.

Figure 13:
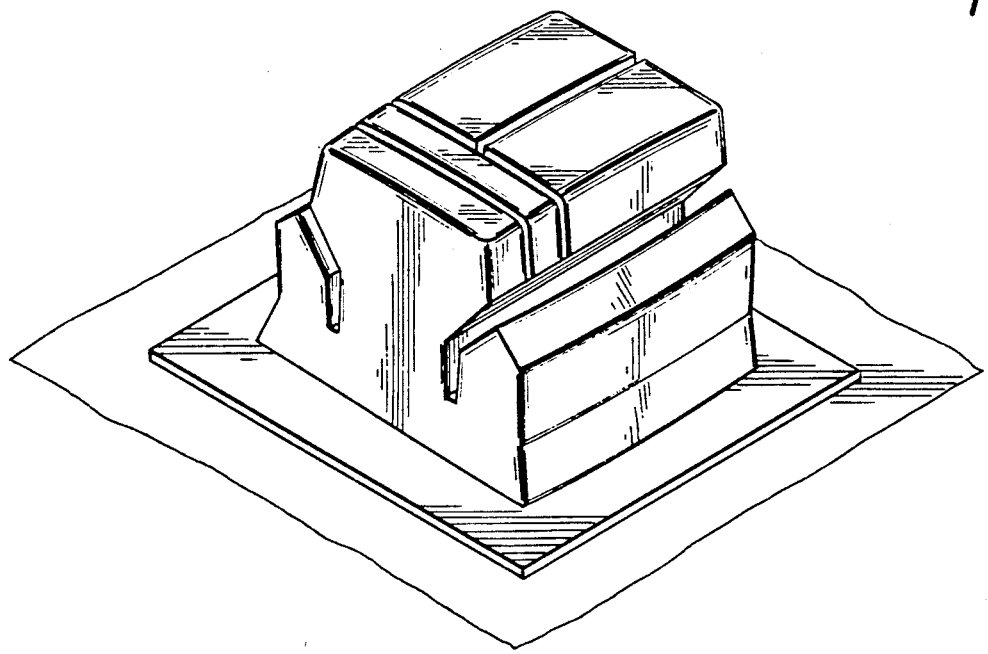
FIG. 13 is a diagrammatic isometric view of the mold shown in FIG. 12, but expanded outwardly by internal air pressure to assist in the removal therefrom of the composite article.

Referring to FIG. 13 the mold 76 is now shown in its expanded state, having fluid pressure applied internally therein, the expansion of the mold aiding in the release of the hood structure therefrom. Note the increased dimension of the insert cavity 88, which aids the removal of the stiffener from the mold.

Figure 14:
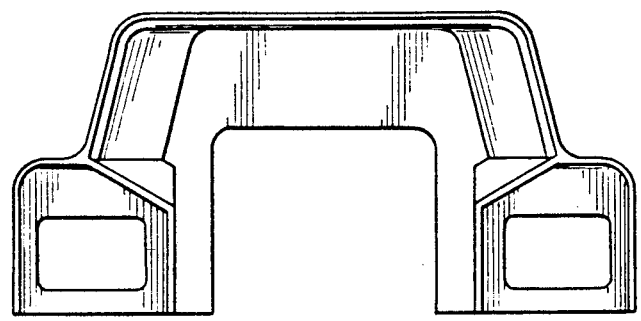
FIG. 14 is a pictorial representation of the actual hood structure removed from the mold shown in FIGS. 12 and 13.

Referring now to FIG. 14 the composite hood structure 78, (that was removed from the mold shown in FIGS. 12 and 13), is shown in a back view. The hood 78 can be seen to include longitudinal three dimensional stiffeners 80 incorporated therein. The ability to incorporate these three dimensional stiffeners in a one-step process is one of the advantages of the present invention.

Figure 15:
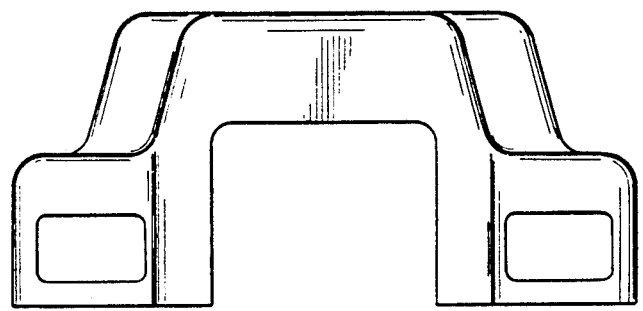
FIG. 15 is a pictorial representation of the front view of the same hood structure shown in FIG. 14.

Referring now to FIG. 15, a front view of the same hood structure 78 can be seen to clearly incorporate openings 82 defined therethrough. The openings may be trimmed easily, along with the edges of the hood 78 since the flash on the article is typically 0.010 inches thick. Such a thin flash can be cleaned up with a pneumatic file. The flash is thin because the fiberglass is preformed directly on the flexible male mold allowing the operator to precisely trim excess glass from the part before it is molded. This creates the molding of "near net" articles.

Since the preform fibers are on the flexible male mold, when the mold is closing the glass fiber is pushed to the edge of the part. This eliminates the risk of a resin-rich edge. Thus, there is no need for a large flashing block to be cut off at tremendous cost in wasted raw materials, labor, and safety equipment to handle the dust and other hazards associated with this type of operation.

Another benefit of the process is hole drilling. Holes required by a customer can all be "near" molded in. Furthermore, the holes can be molded in throughout the laminate thickness. In traditional resin transfer molding, if holes are molded in more than one plane, the part will die lock itself in the tool. In the practice of the process of this invention, however, the part is demolded from the flexible male mold by collapsing the flexible male mold away from the part by use of vacuum, thus avoiding the risk of die lock. Therefore, any number of holes in any plane can be "near" molded in.

Referring now to FIGS. 16 and 17 representative lateral stiffeners 86 are shown placed in insert cavities 88 defined inwardly from the flexible mold surface 90. It should be well understood that many other inserts may be incorporated into the final article 68 as required by structural necessities. FIG. 16 shows the article 68 prior to being wetted by resin, the flexible mold surface 90 being spaced a variably spaced distance 92 away from the reference surface 36. In FIG. 17, the variably spaced distance 92 has increased by an amount roughly equivalent to the initial resin flood volume 96 with movement of the flexible mold surface 90 indicated in the direction of movement of arrows 98. Due to the movement of the flexible wall 24 away from reference surface 36 it can be seen that the resin may be easily distributed throughout the volume occupied between the respective mold surfaces 90. Decreasing resin flood time of course, decreases the cycle time of the process, with a subsequent increase in part production rates.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. Apparatus for use in forming a composite article, a portion of said article including a hardenable resin, said apparatus comprising:

a rigid female mold having a cavity defined downwardly therein and a corresponding reference surface facing said cavity, a flexible male mold having a mold chamber formed therein, a portion of said mold chamber bounded by a flexible wall having a flexible mold surface positionable a variably spaced distance away from said reference surface, said wall deformable away from said reference surface when said hardenable resin is injected between said reference surface and said flexible wall, said wall including an insert cavity extending inwardly from said flexible mold surface for forming a lateral stiffener on said article, and resin injection means for injecting said resin between said reference surface and said flexible wall.

2. The apparatus of claim 1 further including peripheral seal means formed about the common periphery of said rigid female mold and said flexible male mold.

3. The apparatus of claim 1 further including vacuum means for establishing a vacuum between said reference surface of said female mold and said flexible wall of said flexible male mold.

4. The apparatus of claim 1 further including first fluid transfer means for transferring fluid into said male mold chamber to move said flexible wall toward said reference surface, and for removing fluid from said male mold chamber to draw said flexible wall away from said reference surface.

5. The apparatus of claim 1 further including second fluid transfer means for transferring fluid between said reference surface and said flexible wall, so as force said flexible wall away from said reference surface.

* * * * *